US006351815B1

(12) United States Patent  (10) Patent No.: US 6,351,815 B1
Adams  (45) Date of Patent: Feb. 26, 2002

(54) MEDIA-INDEPENDENT DOCUMENT SECURITY METHOD AND APPARATUS

(75) Inventor: Phillip M. Adams, Salt Lake City, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/364,545

(22) Filed: Jul. 29, 1999

Related U.S. Application Data

(62) Division of application No. 08/680,565, filed on Jul. 12, 1996.

(51) Int. Cl.[7] .................................................. H04L 9/00
(52) U.S. Cl. ......................... 713/200; 713/201; 380/51; 358/448; 382/172
(58) Field of Search .......................... 713/200; 380/51; 358/448; 382/173

(56) References Cited

U.S. PATENT DOCUMENTS

| | | | |
|---|---|---|---|
| 3,919,528 A | 11/1975 | Cooper et al. ......... 235/61.11 A |
| 4,837,737 A | 6/1989 | Watanabe ................... 364/900 |
| 5,149,140 A | 9/1992 | Mowry, Jr. et al. ........... 283/93 |
| 5,303,370 A | 4/1994 | Brosh et al. .................. 380/51 |
| 5,490,217 A | 2/1996 | Wang et al. ................... 380/51 |
| 5,606,628 A | * 2/1997 | Miyabe et al. ............... 382/183 |
| 5,636,292 A | 6/1997 | Rhoads ........................ 282/232 |
| 5,649,185 A | 7/1997 | Antognini et al. .......... 395/605 |

* cited by examiner

Primary Examiner—Ly V. Hua
(74) Attorney, Agent, or Firm—Haynes and Boone, LLP (57) ABSTRACT

A method and apparatus for providing media-independent security for a document may be programmed to create a document file having two or more components. In one embodiment, a document may include a background object, an image object (e.g. text, graphic, both, or the like), and a watermark object. When output, the image object is directly interpretable by a user. Meanwhile, in the background object, watermark object, or both, a high-resolution pattern may be stored to be output with all copies of the document. Encoded in some binary symbol in the pattern is security data. Resolution is high enough that the binary symbols are undetectable by a human eye. A processor may be programmed to recognize (e.g. read) the pattern, decode the pattern into binary data, and decode the binary data to characters directly interpretable by a user. Information relating to creation and control of a document, signature, or the like, may all be encoded independent from the principal image (e.g. text, graphic), to be virtually undetectable by human eyes, yet non-removeable by copying methods, including photocopying, scanning, electronic storage, and the like.

15 Claims, 5 Drawing Sheets

MEDIA-INDEPENDENT DOCUMENT SECURITY METHOD AND APPARATUS

RELATED APPLICATIONS

This application is a divisional of and claims priority to U.S. patent application Ser. No. 08/680,565 filed Jul. 12, 1996.

BACKGROUND

1. The Field of the Invention

This invention relates to document processing application software and, more particularly, to novel systems and methods for creating secure documents traceable to their origin, regardless of copying, and regardless of changes in media between copies. For example, a document may be copied onto a computer diskette, it may be printed to a printer, it may then be photocopied, it may then be scanned into a scanner to be restored in the -memory of another computer.

2. The Background Art

Document security has been a difficult task from the inception of the written word. In a typical office, document security is often based on physical custody. Where a possibility exists for a document to be duplicated, certain means exist to render a duplicated copy unreadable.

For example, a document may be produced on a paper that contains a security mark such as the word "confidential" as a large, colored watermark. On a conventional copy machine, such as a photocopy machine, such a watermark turned black when copied. A black copy of a watermark, when a document was duplicated, was used to render the duplicate unreadable. Thus, this security method permitted only a single instance of a document, the original.

However, modern copier technology now allows copying of colors. Moreover with the advent of color copiers having the capacity for multiple shadings, conventional watermarks become inadequate.

A paperless office may present a different set of security issues. For example, an electronic document may be a "scanned" image of a paper document. Such a duplicate may be distributed to one or more individuals by a single keystroke. That is, with networks and internetworks connecting various computers, distribution may be massive with minimal individual effort. Moreover, any recipient of an electronic document may forward duplicates to an untold number of other individuals, some of whom may not be authorized to receive the document. Moreover, once a document has been duplicated, and distributed, electronic duplication-may render more difficult the determination of a "leak" through which unauthorized documents were distributed.

To combat electronic security problems, many organizations, such as the United States Department of Defense (DOD), for example, prohibit transmittal of certain sensitive information by electronic mail. Other-organizations attempt to control access to originals. Nevertheless, such an approach is rendered useless once an original document has been electronically sent to other individuals. Security as to all recipients of a document may be effectively impossible by conventional methods.

Other problems exist in electronic or paperless offices. For example, a recipient of a document may often "cut and paste" information received electronically. That is, most word processors and image processors, including drawing packages, drafting packages, and the like, permit editing of any or all portions of an electronic document.

To alter original documents, or fabricate new documents, is a simple matter of selecting certain editing tools and copying selected portions of the document received. Thus, editing may be virtually uncontrollable.

An internal office memo having an originator's initials written on it, for authentication purposes, may be dangerous. For example, a recipient may scan a document into a computer using an image scanning device. The individual may then use a word processor or drawing application to "cut and paste" the image of the entire signature to be used at will. An individual may even fit or generate a piecewise function to re-create the signature at will.

Numerous efforts attempt to control the use and abuse of electronic signatures. Nevertheless, such efforts typically require a separate security file to be associated with an original document. If the security file is separated from the original, uncontrolled use of the signature may again be possible. Moreover, such separation may be extremely simple. One may print an original document with the electronic signature on it, scan the printed document back into a word processor or drawing processor, then "cut and pastel" the signature to create a separate signature file. Transforming an original document from a paperless form to a hard copy or paper form effectively separates the original security files from the document itself. The original document may be rendered anew without any security file when scanned back into the computer hosting the word processor or drawing processor application.

Similarly, once a document has been misappropriated, improperly distributed, or the like, one of the improper copies may be located. Nevertheless, the source of the unauthorized copy is still not known. A pattern of unauthorized distribution may be difficult to locate or remedy.

What is needed is a document security system that is independent of the medium of transfer. That is, a document it may be transferred on a wire, on an electromagnetic diskette, on a laser-encoded compact disk, on paper, on RAM, or the like. What is needed is a system in which transfer of a document by any medium, is incapable of removing security information from a resultant file.

BRIEF SUMMARY AND OBJECTS OF THE INVENTION

In view of the foregoing, it is a primary object of the present invention to provide a system for creating media-independent security for a document.

It is a further object of the invention to provide a processor programmed to execute instructions effective to create a document file and security instructions effective to create a security code, integrated into the document to be non-removable.

It is another object of the invention to provide a memory device operably connected to a processor for storing document files in a format to contain a substantive portion containing data corresponding to a readable image, a format portion corresponding to a layout of the document for outputting, and a security portion independent of the substantive portion and effective to be output as an integrated part of the document to be visually unreadable by human vision in a hard copy form.

It is another object of the invention to provide an input device for receiving an input signal corresponding to security data to be encoded into a document as an integrated portion thereof, in a security portion corresponding to the security code and unextractable from the document.

It is a further object to provide an output device operably connected to a processor to receive output signals corresponding to a document file such that the output device may render a document readable to a user as to substantive portion, while creating an independent security image unreadable to a user and yet effectively inseparable from the substantive portion in hard copy of the document.

It is another object of the invention to connect the foregoing output device to a processor, with the output device having a resolution sufficiently high to print a pattern of marks at a resolution greater than that of the eye of the user.

It is a further object of the invention, to provide a scanner connected to a processor to read a hardcopy of a document into a bit map, transferring the document to a block of data corresponding to a substantive, visually readable portion, and a block of data corresponding to a visually non-readable security portion, the blocks being adaptable to be output together in a single document, but remaining independent of one another.

It is another object of the invention to provide a security pattern encoded in symbols corresponding to a value of one and a value of zero, thus creating a binary coded pattern within a bit map of a security image, visually unreadable by a user directly.

It is another object of the invention to provide an application having an executable portion of coding containing instructions effective to read and decode binary data from a bit map of a security image printed width each hard copy of a document.

It is also an object of the invention to provide a security executable effective to receive and process data input by a user, and transfer an image containing the data into a document, the information corresponding to security information associated with the document.

It is another object of the invention to create an object-oriented application having an image object, which may correspond to a figure, a drawing, a photograph, or other pictorial image or a textual image containing text or other alphanumeric or ASCII characters, in one layer, with an additional independent layer containing a security image visually unreadable by a user and inextricably embedded in an object selected from a background object and a watermark object.

It is another object of the invention to provide a media-independent security apparatus and method for documents, comprised of a memory device having a block for storing a processor executable, a block comprising substantive data to be output for reading by a user, a format block, a security executable block, and a security data block.

It is also an object of the invention to provide a pattern-encoding palette accessible by a user for selecting a pattern to be used to encode a binary data representation of information,provided by a user, binary data being encoded in an image rendered in the pattern selected by the user.

It is another object of the invention to provide a data structure having a buffer adaptable to receive data corresponding to a background object, a substantive image object, and a security data object, each object being independently storable.

It is yet another object of the invention to provide a method for creating, transferring and verifying a media-independent document containing security information, intractably integrated with the document, yet independent of the substantive content, such as text and figures in the document.

It is an additional object of the invention to provide a method for inputting security image data corresponding to a visually non-interpretable image output displayable with a visually interpretable image by a display device in a format non-interpretable by a user viewing the interpretable image with the naked eye.

It is an additional object of the invention to create in one medium, a document having a substantive portion corresponding to one image, a security portion corresponding to a security image comprising an array of symbols arranged to represent selected security data in a binary coding format uninterpretable by a user viewing the document in the medium.

It is another object of the invention to provide a method for transferring a document from one medium to another medium, and decoding from a visually non-interpretable image a pattern of symbols into a binary file representing security information, and then outputting security information decoded from the binary file.

It is yet another object of the invention to provide a method for transforming an array of symbols printable in a visually non-interpretable image, in a security portion of a document, into a bit map, capturing a header containing a target pattern made of the symbols, synchronizing a reading device to begin reading the symbols, orienting the reading device in accordance with a direction indicated by the target pattern, in order to read a band of the symbols proximate the header, and decoding the band to provide an output readable by a user.

Consistent with the foregoing objects, and in accordance with the invention as embodied and broadly described herein, a system, method, and apparatus are disclosed in various embodiments of the present invention. In one embodiment, an apparatus in accordance with the invention, may be configured as a machine for providing media-independent security for a document. The machine may include a processor programmed to execute instructions effective to create a document file, and security instructions effective to create a security code. A memory device may be operably connected to the processor to store the document file. The document file itself may include a substantive portion, a format portion, and a security portion.

The substantive portion may contain data corresponding to a visually interpretable (readable, recognizable) image. That is, an image may be text, a picture, a drawing, or the like. A readable (interpretable) image may be readily understood by a user directly, by viewing with the naked eye. For example, a user may view a text document or graphic image on a screen of a monitor or on a page output by another output device, such as a printer. The unreadable image may be output as part of a document, provided by an output device such as a printer, monitor, or the like, but its security information is not detectable to human vision, nor is the binary coding readily determinable.

A format portion may contain data corresponding to instructions or data required by a document processor, such as a word processor or drawing processor application, or the like. The format portion may correspond to data required by a word processor or drawing processor (application) to output a document. That is, the format portion may contain layout information required to output a document for presentation to a user.

A security portion may be associated with a security code. The security portion may be completely independent from the substantive portion. That is, certain security systems alter letters in subtle ways that are not readily detectable. However, such systems require complex image-recognition algorithms in order to be read.

In one embodiment of an apparatus made in accordance with the invention, a security portion of a document may contain data corresponding to a security image. The security image may be effective to be output by an output device as part of the document. Nevertheless, the security image may be output to be visually unreadable by human vision. That is, the security portion may be output as an image comprising a pattern of binary symbols output at a resolution higher (more dots or lines per inch) than that viewable or recognizable by human vision.

For example, a printer with current technology may print a resolution of 600 dots per inch. Moreover, the printer may print with a 600 dots per inch resolution in two dimensions. Thus, a symbol might contain, for example, three dots, each 1/600th inch in length. The resolution of the human eye is substantially less than 600 dots per inch. Thus, a symbol that is a mere three 600ths of an inch is not to be detected from other symbols of similar size and various shapes by a human eye.

In an apparatus made in accordance with the invention, an input device may be operably connected to a processor to receive an input signal from a user. The input signal may correspond to security information to be encoded in the security portion. Thus, a user may input security information to be encoded into a security portion of a document as an image. The image may be output as a watermark, a background image, or the like, independent from the image data corresponding to the substantive image (drawing, text, etc).

The apparatus made in accordance with the invention may include an output device connected to the processor to receive an output signal. The output device may be adaptable to output documents in a medium adaptable to render the substantive portion readable directly by visual inspection. Meanwhile, the output device may output the security portion in a format readable only at a resolution greater than the resolution of human vision and in a binary coding.

Input devices may include those known in the art, or other devices developed for the purpose. Likewise, output devices may be those known in the art or others developed for the purpose. Moreover, documents may be input and output directly between machines, between a user and a machine, between a machine and a user, between electronic formats and hard copy formats, combinations thereof, or the like.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the figures herein, could be arranged and designed in a wide variety of different configurations. Thus, the following more detailed description of the embodiments of the system and method of the present invention, as represented in FIGS. 1 through 7, is not intended to limit the scope of the invention, as claimed, but it is merely representative of the presently preferred embodiments of the invention.

Figure 1:
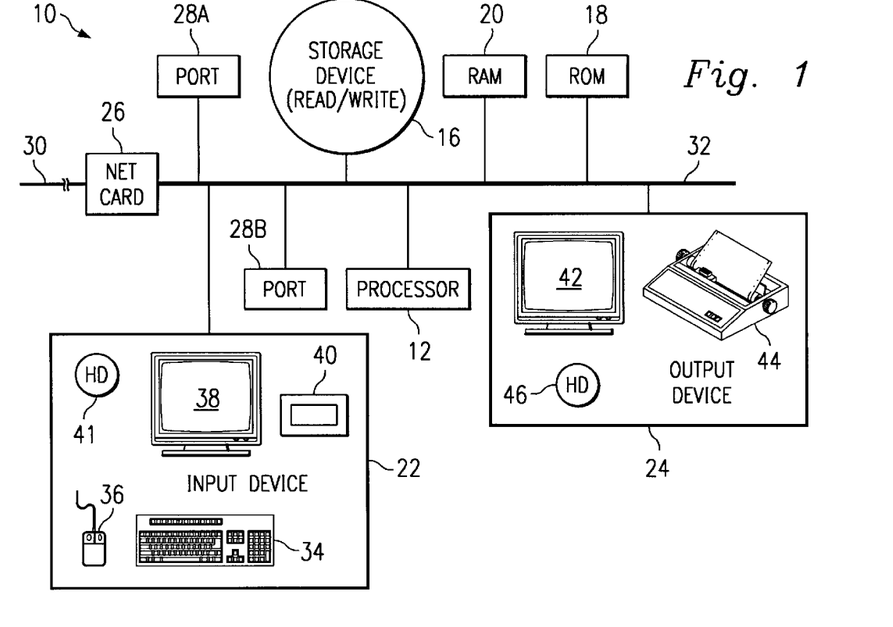
FIG. 1 is a schematic block diagram of a machine made in accordance with the invention to be programmable to implement the invention.
Figure 2:
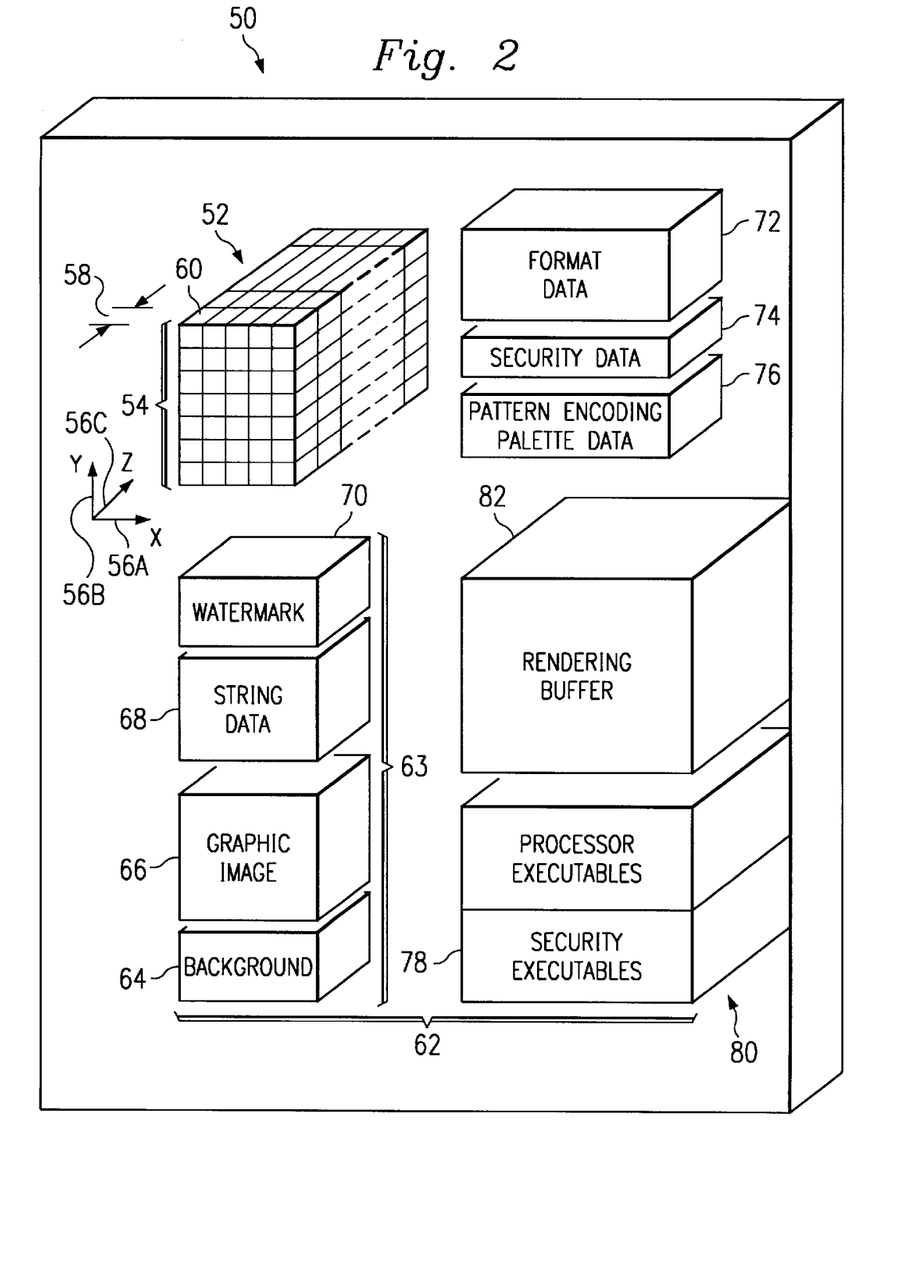
FIG. 2 is a schematic block diagram of a memory device, illustrating data structures for storing therein the executables and data for operating an apparatus and method in accordance with the invention.
Figures 3A, 3B, 3C:
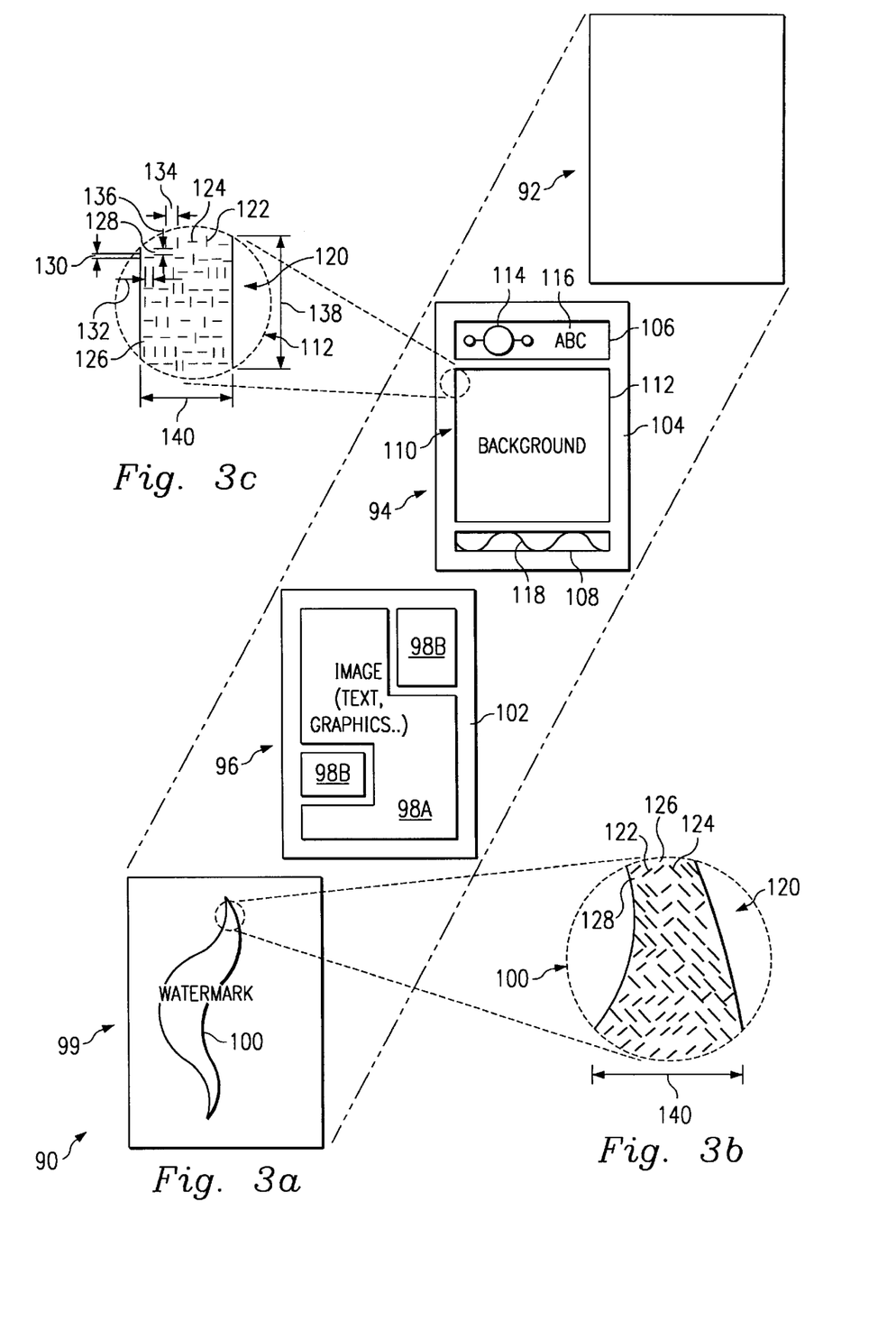
FIGS. 3a–c are a schematic block diagram with enlarged views of a document object made in accordance with the invention from component objects, some of which contain data encoded in a pattern for a background or a watermark.

The presently preferred embodiments of the invention will be best understood by reference to the drawings, wherein like parts are designated by like numerals throughout. FIG. 1 illustrates an apparatus or machine made in accordance with the invention. FIG. 2 shows the allocation of memory blocks in a memory device 50 for storing data structures created and used by the apparatus 10 of FIG. 1. FIGS. 3a–c illustrate schematically an object-oriented structure for a document created and read in an apparatus and method in accordance with the invention. Multiple layers of objects may be created for storing and outputting specific information, including information interpretable directly by human inspection, and information requiring a machine for reading or interpretation.

Figure 4:
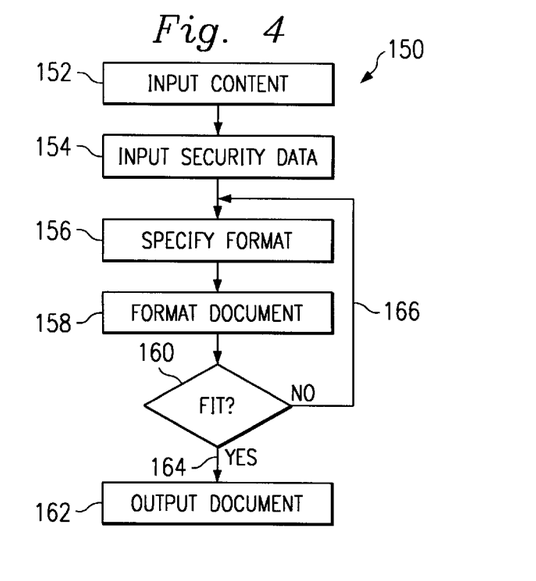
FIG. 4 is a schematic block diagram of a process for creating documents using media-independent document security.
Figure 5:
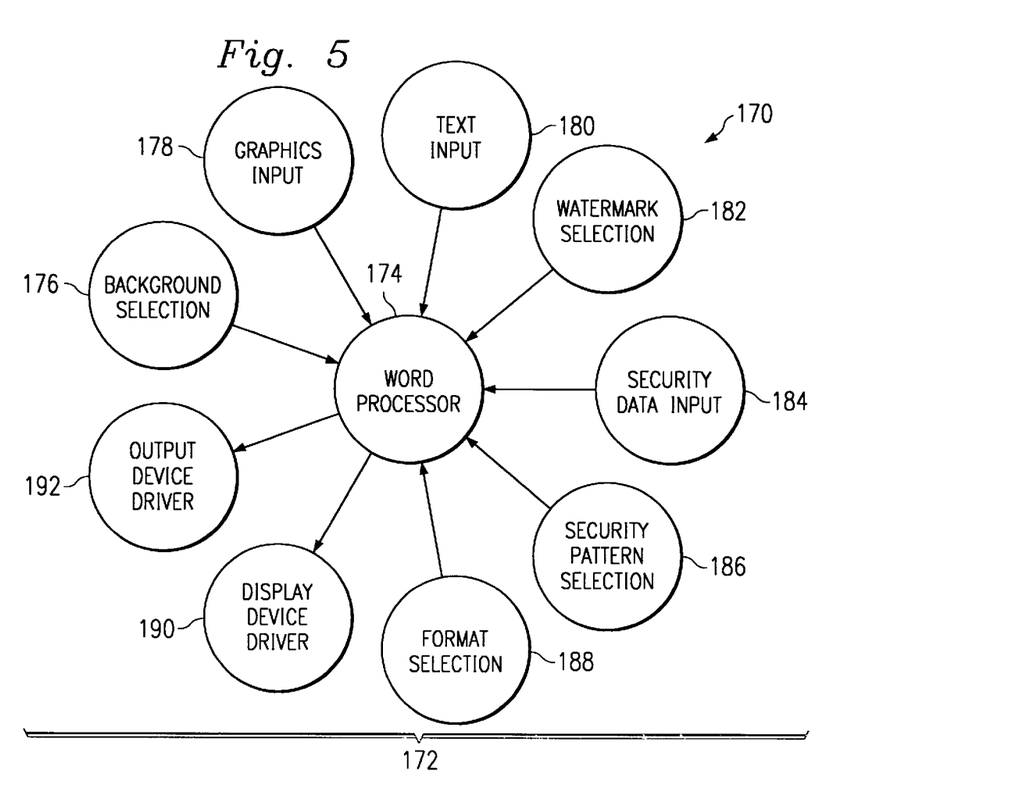
FIG. 5 is a schematic block diagram of a plurality of processes that may be run in one or more processors for providing media-independent security in documents.
Figure 7:
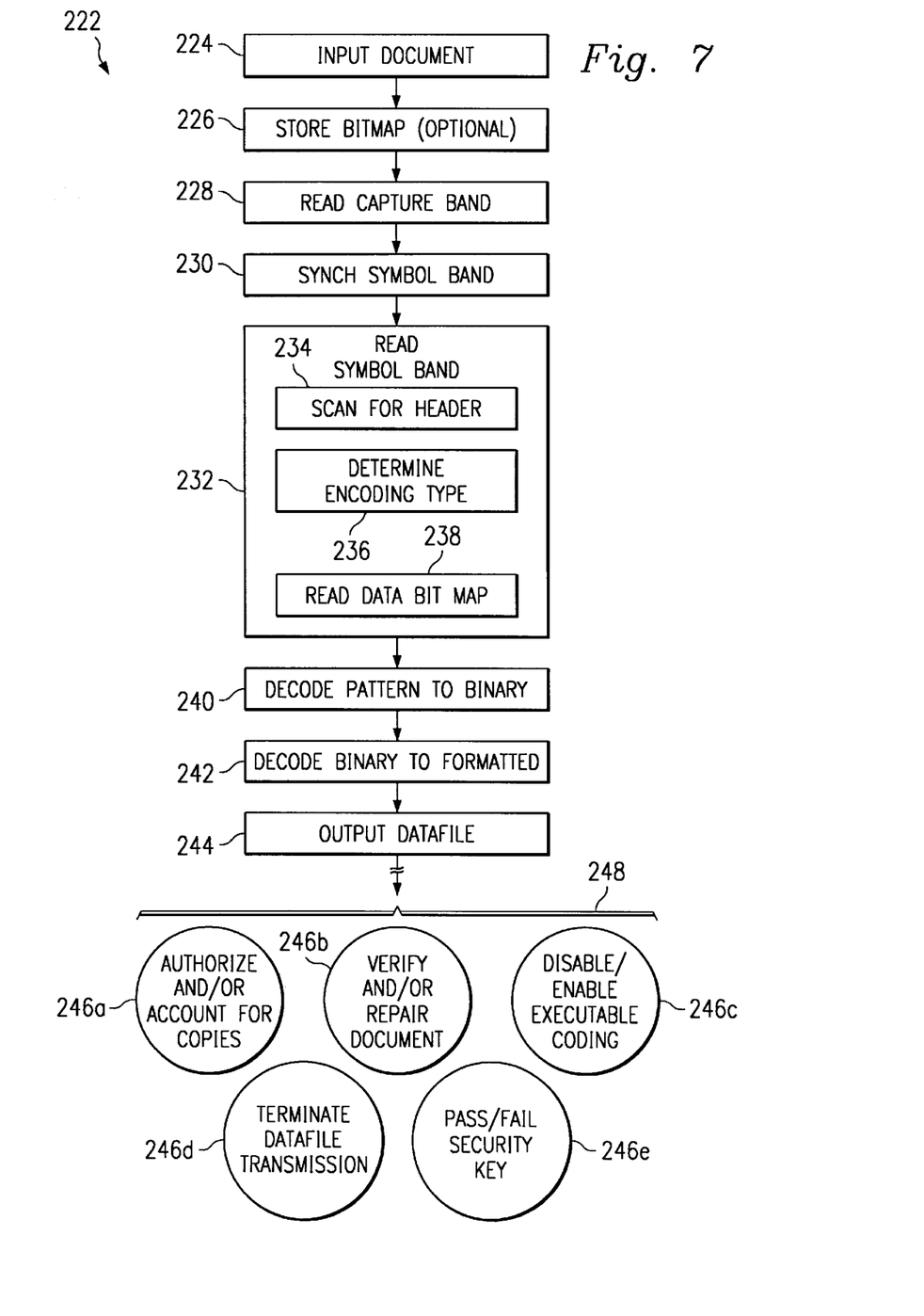
FIG. 7 is a schematic block diagram of a process for inputting, reading, and outputting a document encoded with media-independent security.

Reference is next made to FIGS. 4, 5 and 7, which illustrate in more detail schematic block diagrams of processes operable in the machine of the block diagram of FIG. 1 in accordance with the memory structures of FIG. 2. These processes may be effective to create and manipulate a document such as that illustrated in FIGS. 3a–c.

Figure 6:
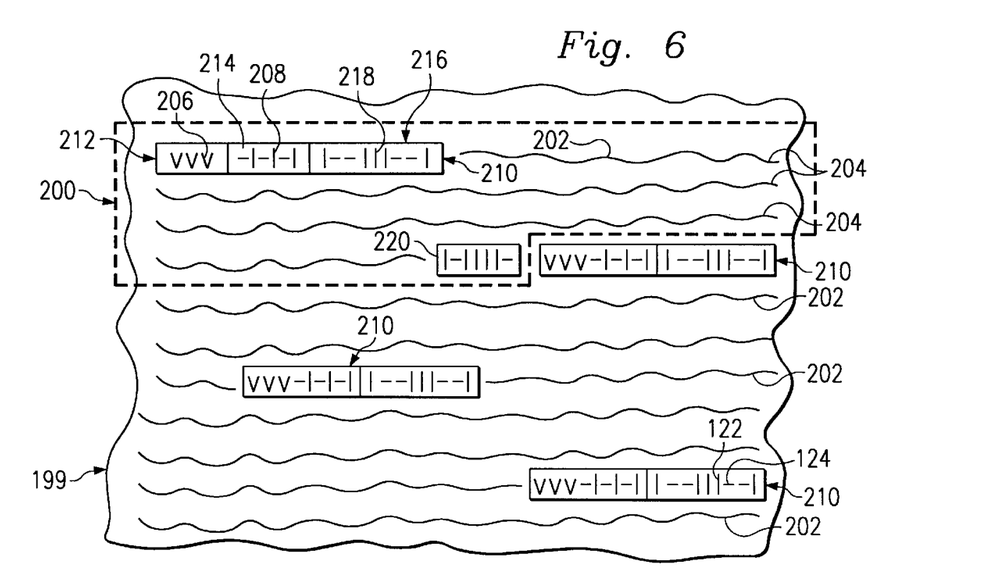
FIG. 6 is a schematic block diagram of a portion of a security image that may be imbedded in a document, such as in a watermark or a background.

FIG. 6 illustrates in more detail one embodiment of an encoding scheme. The scheme is adaptable for inclusion in the watermark 100 or background 94 illustrated in FIGS. 3a–c.

Those of ordinary skill in the art will, of course, appreciate that various modifications to the detailed schematic diagrams of FIGS. 1–7 may easily be made without departing from the essential characteristics of the invention certain preferred embodiments of a as described in connection therewith. Thus, the following description of the detailed schematic diagrams of FIGS. 1–7 is intended only by way of example. The description simply illustrates certain presently preferred embodiments of an apparatus and method consistent with the foregoing description of FIGS. 1–7 and the invention as claimed herein.

Referring to FIGS. 1–3, a machine 10 or apparatus 10 may be embodied to have a processor 12 operably connected to a memory device 14 for exchanging data. The memory device 14 may be comprised of one or more of the devices 16, 18, 20. A storage device 16 may be a hard drive, tape drive, or other nonvolatile storage medium. The read only memory (ROM) 18 may be used in a programmable, nonprogrammable, re-programmable, erasable programmable or electronically erasable programmable format. In general, the ROM 18 may be readable by the processor 12 during operation of an application on the processor 12, but is not "write-enabled" to receive data written by the processor 12 while running an application.

The RAM 20 may be one or more of many random axis memory devices known in the art. The RAM 20 may be used during operation of the processor 12 for temporary storage. In some embodiments, the RAM 20 may be permanently powered such that it represents relatively non-volatile storage, practically speaking.

The apparatus 10 may include an input device 22 for receiving inputs from a user. Similarly, an output device 24 may be operably connected with or without the input device 22, to the processor 12 to provide outputs to a user or another device.

The apparatus 10 may be provided with a network card 26 for accessing a network 30 or other computers and devices connected to a network 30. Likewise, other ports 28A, 28B may be provided for connecting to additional input devices 22, output devices 24, or other peripheral devices that may be desired to be connected to the bus 32. Thus, other devices may be connected by the bus to the processor 12, memory device 14, etc.

The input device 22 may include one or more hardware devices. For example, the input device 22 may include a keyboard 34 or a mouse 36 for indicating inputs. The screen 38, may be a touch screen or may simply be a monitor providing feedback to a user for controlling the mouse 36 effectively.

A scanner 40 may be included within the general category of the input device 22 for reading in a document. The scanner 40 may or may not include an optical character recognition function. In general, a scanner 40 may be able to produce a bit map of an image of a document scanned. Alternatively, certain processing of an image or bit map may be organic to the scanner.

An output device 24 may likewise include one or more individual devices. For example, the output device 24 may include a monitor 42 for providing feedback to a user or for outputting a document to a user. Similarly, the output device 24 may include a printer 44 or a hard drive 46. In general, the output device 24 may be remote from the processor 12 and the bus 32. That is, an output device 24 may be connected to one of the ports 28A, 28B or may exist on the network 30, or external to the network 30 beyond the network card 26. Input devices 22 may also be remote from the processor 12, at a port 28 or on the network 30.

In general, the processor 12 may host applications, run executables, and otherwise process data. In general, the RAM 20 may be allocated to store data structures (blocks of configured data) used by applications running on the processor 12. Applications and standardized data may also be provided from the ROM 18 and may be downloaded from the storage device 16 to the RAM 20 or to the processor 12 as needed. Applications or other executables running on the processor 12 may typically be stored in the storage device 16 when not in use.

Referring to FIG. 2, the memory device 50, or simply memory 50, may be a portion of the RAM 20. The memory 50, or memory block 50, may be comprised of a plurality of blocks 52. A block 52 may be comprised of a plurality of storage locations 54 for storing data bits or words. The x axis direction 56A and y axis direction 56B may be literal directions in a memory device 50. These directions 56A, 56B, may also correspond to index positions in an array.

In general, a z axis direction 56C may be represented by a number of bits, a surface, a gray scale, or a value corresponding to a storage location 54. Storage location 54 corresponds, in turn, to a particular location identified by the position 56A, 56B. That is, an ordered pair may identify a position of a location along the x axis 56A and the y axis 56B. The coordinates may identify a specific storage location 54 containing a value 56C. In a typical memory device 50 the z axis direction 56C may actually correspond to a depth 58 measured in bits 60. Each storage location 54 may have some number of bits 60 of depth 58 representing a value.

In general, each block 52 may comprise data. Thus, the various blocks 52 may comprise data 62. However, the data 62 may merely represent information to be processed by the processor 12. However, in general, data 62 may also include instructions (executables) to be used to program the processor 12.

A document 90 (see FIGS. 3a–c) may be represented by background data 64, alternately referred to simply as background 64, graphic data 66, string data 68 or character data 68, and watermark data 70. Background data 64 may correspond to a background, such as a border, letterhead, logo, or the like. Background data 64 stored may represent and correspond to an object 94 that may be output as part of a document 90.

The graphic data 66 may represent a graphic image such as a picture, drawing, or the like, that may be part of a document 90. Likewise, the string data 68 or character data 68 may represent the characters that will actually appear as text and ASCII symbols in the document 63.

Likewise, a watermark 70 may actually contain data that will be written over the face of a document 63 to provide security or some other identification function. In accordance with the invention, the watermark 70 may contain data effective to communicate security information to a processor 12 reading a bitmap of the document 63.

A format block 72 or format data 72, or simply format 72 may be stored in the memory 50. The format 72 may contain data used by a word processing application, graphic image processing application, page processing application, or the like, effective to lay out the document 63.

Security data 74 or simply "security" 74, may be stored in the memory 50 as an individual block 74 representing certain information input by a user through a input device 22. The security data 74 corresponds to information that a user considers important or significant and desires to include in all copies of the document 63 rendered in all media. The pattern encoding data 76 or pattern 76 contain data corresponding to a pattern pallet or pattern encoding pallet usable by a user to select the type of pattern for encoding the security data 74 in an image on paper or in other data 70, 64 associated with the document 63.

Different encoding schemes are available. For example, actual ones and zeroes are symbols. Likewise, the Hecht system uses forward and backward slash marks such as appear as ASCII characters in word processors. Similarly, vertical marks may represent ones while horizontal marks may represent zeroes. In general, any number of patterns may be created from any selection of symbols representing a one and a zero. The pattern encoding data 76 or pattern 76 may contain any data required for translating or transforming the security data 74 into a suitable encoded pattern to be included in a watermark 70 or background 64 of the document 63.

A processor 12 may be programmed using processor executables 80 stored as applications, subroutines, processes, or the like, to be executable by the processor 12.

The processor executables 80 may be loaded into the processor 12 in order to process the document 63 into a hard copy or other format useful to a user.

The security executable 78 may be stored in the memory 50 for operating on the security data 74 and pattern data 76. Likewise, in general, the processor executables 80 operating on the processor 12 may be responsible for inputting, processing, and outputting the background data 64, graphic data 66, string data 68, and watermark data 70. Similarly, the security executables 78 may be responsible for processing the security data 74 and the pattern data 76. In certain embodiments, the security executable 78 may also operate on the watermark data 70 and background data 64 to the extent that alteration is required by the pattern data 76 or security data 74.

Nevertheless, in general, the processor executables 80 may operate to create and alter a rendering buffer 82. The rendering buffer 82 may be used to store the document 63. Thus, the pattern data 76 may be used by the security executables 78 to alter the rendering buffer 82 to include the security data 74, in the: document 63 as appropriate. For example, the watermark 70 or background 64 may be written over to encode the security data 74 in the rendering buffer 82.

In general, the rendering buffer 82 stores the version of the document 63 that will actually be rendered by an output device 24. In certain embodiments, a rendering buffer 82 may not be required. That is, if the pattern data 76 is used by the security executable 78 to write directly to the watermark data 74, the background data 64, the document 63 could be output directly without a rendering buffer 82. As a practical matter, a rendering buffer 82 makes programming simpler, and execution faster.

Referring now to FIGS. 3a–c, a document 90 may be comprised of several components. For example object layers 92 may be assembled to form a document 90 having multiple, independent characteristics. Several objects may be assembled into a single layer 92. Some functional layers that may be useful include a background layer 94, an image layer 96, which may have both text images 98A and graphical images 98B, and a watermark layer 99. The watermark layer 99 may include one or more watermarks 100 to be printed with all outputs of the document 90.

An object or layer 92 (e.g. object plane 92) may have a margin 102, 104 leaving a region of white space. The margin 102, 104 may be filled by a security image employing an uninterpretable pattern relying on one of many gray levels, colors, or the like.

A masthead 106 or header 106 is often used on letterhead, pages of a multiple-page document 90, and the like. Similarly, a footer 108 may be placed below the substantive content of a page of the document 90. A border 110 using an image, pattern, or borderline 112 may be presented in any thickness, darkness, or similar characteristic desired. A graphical logo 114, or alphanumeric (e.g. text, characters) logo 116 may be presented in a masthead (header) 106 or footer 108.

Within the masthead 106, or footer 108 may be substantive content 118 such as textual or graphic content material 118. The content material 118 may include such items as additional advertising messages, an address, telephone number, international wire service access numbers, network addresses, or the like, pertaining to a sender or generator of the document 90.

The edges of a pattern 120 of a watermark 100 may be distinct or imaginary. Within the watermark 100 may be symbols 122, 124 representing binary digits "one" and "zero," respectively. The symbols 122, 124 may be separated by horizontal spaces 126 (gaps, side to side) between adjacent, individual symbols 122, 124. Lines of symbols 122, 124 may be separated by vertical spaces 128 (gaps, top to bottom).

Similarly, a pattern 120 of a line 112 may have an edge or border that is either distinct or imaginary. That is, the border or edge maybe represented by either the presence or absence of a value for a pixel at the point in question. The symbols 122, 124 may, as with a watermark 100, be adapted to present binary data by some recognizable presentation. For example, slash marks oriented right or left, straight lines oriented vertically or horizontally, or the like may be used. Selection of a thickness 130 and length 132 may be automatic or user-selected, along with a spacing distance 134 (width) between adjacent symbols 122, 124, and spacing distance 136 (height) between lines of symbols 122, 124. Any set, of a host of possible symbols 122, 124, with appropriate spacings, 126, 128 may be relied upon for a pattern 120 or security image 120.

The actual length 138 (e.g. height) and breadth 140 (width) of a pattern 120 may vary. Variation may be according to some automatic determining factor, user selection, or some other parameter. For example, sizing may be dependent upon a space requirement related to the amount of security data 74, the pattern encoding data 76 associated with a selected pattern type, and the number of repetitions of the security data 74 in the pattern 120 forming a security image 120.

The encoding process 150 may include several individual steps. In one embodiment, an input step 152 may provide for the substantive inputs for the document 90. The input step 154 may provide for an input of security data to be combined with the content of the substantive input step 152. A specifying step 156 may provide for receipt of input by which the document 90 may be formatted.

The format step 158 may provide for formatting document 90 using the format specified in the specifying step 156 to arrange the substantive content from the input step 152 and the security from the input step 154 to provide a test case for the document 90. The test 160 may then provide for examination of the resulting document 90 to determine whether all information from the input steps 152, 154 has been included in the document.

For example, if insufficient area remains in a borderline 112 of a border 110, then the entire security data 74 may not be printable with a document 90. Therefore, a line density (with, thickness) for the line 112 may be increased. Similarly, if insufficient white space exists within a document 90, such that the watermark 100 occupies insufficient area to contain all of the security data 74 intended to be incorporated into the watermark 100, then spacing between lines, spacing between paragraphs, or the like may need to be increased in the format of the document 90. That is, for example, additional white space would provide for more free area of the watermark 100 to represent unobstructed replications of the security data 74 as a security image.

A security image, although undetectable to the human eye, may be a retrievable portion, or an entire pattern of the watermark 100 or the background 94.

Referring now:to FIG. 4, in the encoding process 150 for creating a document having media-independent security codes impeded therein, may provide for an input step 154 or input 154. The input 154 may involve an input by a user directly through any of the input devices 22. The input step 154 may provide for inputting a variety of information, such as, for example, a name of an author, an organizational name, a security classification, an address, a phone number, or any other information that might identify a source, a destination, a category of information, or a restriction of dissemination of information contained in an associated document 90. Thus, in general, a user may input security data 74 during an input step 154.

The test 160 determines whether or not the format step 158 needs to be repeated. However, if nothing changes, then an inappropriate or inadequate format would remain so. Thus, the specifying step 156 is captured within the return loop 166 in the event that the test 160 fails. That is, the test 160 returns a negative response or state when the security data 74 will not fit the watermark 100 or background 94 were intended.

A negative response to the test 160 repeats the specifying step 156 and the format step 158. A positive response to the test 160 results in an advance 164 to the output step 162.

The output step 162 provides for outputting the document 90. Outputting may occur with any or all of the layers 94, 96, 100, as desired.

Referring now to FIG. 5, a document creation process 170 may include a plurality of threads 172 or processes 172. The threads 172, may operated in parallel. Alternatively, although typically less responsive to a user, the threads 172 may operate in series. As subroutines or calls.

In one embodiment of an apparatus and method in accordance with the invention, a word processor 174 may have functional responsibility for creating a document. The expression "word processor" 174 may, in general, be thought of as a "document processor" 174. For example, a word processor application is often regarded as a typing program for rapid editing. A drawing application may be regarded as primarily a graphic package, but may typically have some capability for editing text. Similarly, a painting application may operate on a principle very different from that of a drawing application, and yet have some facility to accommodate drawings, and to edit text. Nevertheless, for the sake of clarity in explanation, word processor 174 may be provided as a thread 172 having functional responsibility for completing a document 90 to be provided by the processor 12 to an output device 24.

Other threads 172 may include as background thread 176 for selecting or creating an appropriate background 94 to be included in a document 90. The background selection 176 or background step 176 or simply background 176 may provide several functional features for a user. The background step may provide to a user a selection of both the content and the choice of a margin 104, a masthead 106, a footer 108, a border 110, a line 112, a logo 114, or the like.

A graphics input 178 may provide a mechanism for a user to control an input device 22 for creating, editing, transferring, loading, copying, or the like, graphic image data 66 to be included in the substantive image 96 of the document 90. As discussed previously, in general, an image 96 may include text 98A or graphics 98B or a combination of text 98A and graphics 98B.

Similarly, a text input thread 180 or text input 180 may provide to a user an opportunity to input, create, edit, import, or otherwise provide string data 68 or character data 68 associated with understandable characters. The text data 68 or string data 68, may in general comprise any or all of the image 96.

The watermark selection thread 182 may provide for creation, editing, importing, copying, or other provision methods for watermark data 70. The watermark data 70 may include a selection of a watermark shape, intensity, a positioning within a document 90, and the like. A watermark 100 is typically a rather unobtrusive image presented on the page associated with the document 90.

One parameter associated with selecting a watermark may control the level of complexity presented to .a user. For example, certain features may be made transparent to a user of the watermark'selection thread 182.

A security data input thread 184 may provide for inputting, editing, copying, selecting, or the like, of the security data 74 by a user. The security pattern selection thread 186, may be separate from a security data input thread 184. Although the threads 184, 186 may be combined into a single thread, the security data input thread 184 may deal with plain text, information written out by a user in a user's native language.

By contrast, a security pattern selection thread 186 may present, in a format visible by a user on a monitor 42 a symbol 122, 124 and an associated pattern 120 or security image 120. Yet, the security data 74 may be encoded in the background 94 or watermark 100 to be indistinguishable by the human eye when output to an output device 24.

That is, in general, the substantive content of a document 90 is output for viewing by a user to a monitor 42 or a printer 44. Such output devices 42, 44 may be relied upon sooner or later with intermediate output to a storage device 46. Nevertheless, in one embodiment of an apparatus and in accordance with the invention, the security pattern selection 186 may provide a limited selection of patterns recognizable by the processor 12, or more properly by a reading process 232 (see FIG. 7).

A format selection step 188 may provide any formatting permissible by a document processor 174. Again, certain layout information regarding a background 94, watermark 100, or a substantive image 96 may be included in the format selection 188. Alternatively, the formatting of a watermark 100 or background 94 may be incorporated into either the watermark selection thread 182 or background selection thread 176.

An output device driver 192 may be one of several, even many, drivers available to provide outputs of data 62 to an output device 24. One may note that in the embodiment illustrated in FIG. 5, the threads 176, 178, 180, 182, 184, 186, 188 provide inputs for the word processor 174. However, the output device driver 192 may receive its inputs as outputs from the word processor 174.

The display device driver 190 may be a subsidiary thread 172 within the output device driver 192. Alternatively, the display device driver thread 190 may be associated with one or more of the input threads 176–188. That is, in general, the functional responsibility of the display device driver 190 may be thought of as a presentation of prompts, feedback, and the like to a user, for the purpose of indicating and receiving inputs.

Referring now to FIG. 6, a security image 120 or pattern 120 may be encoded in one embodiment of an apparatus and method in accordance with the invention, to include a pattern segment. 199. As discussed, the security data 74 may be combination with wither the watermark data 70 or background data 64 for inclusion in a document 90. That is, within a rendering buffer 82, for example, image data 68, 66 and watermark data 70 and background data, may be combined with security data 74 according to a format specified by format data 72. To be processed by a word processor 174 to provide a document 90.

The pattern segment 199 may include a packet 200 replicated numerous times. The packet contains a plurality of symbols 122, 124 representing ones and zeros respectively, to represent information 202. The information 202 may correspond directly to the security data 74. Illustrated in FIG. 2. In one embodiment, the information 202 may be arranged in lines 204 of symbols 122, 124. A standard symbol 206 may be provided as an initial, universally recognizable, independent symbol enabling a processor 12 to recognize a header 210. The standard symbol 206 may be thought of as either all or part of a capture band 206.

For example, in one presently preferred embodiment, the lines 204 may be aligned in parallel for ease of interpretation by the processor 12. A header 210 may begin with a standard symbol 206 to indicate the beginning of a header 210 or even the presence of a header 210.

The standard symbol 206 may be recognizable by the processor 12 at virtually any orientation. For example, if a document 90 is input by a scanner 40 operating as an input device 22, it may be very helpful if the standard symbol 206 in the header 210 is recognizable at any orientation on a platen of the scanner 40.

An encoding symbol 208 may follow the standard symbol 206 to indicate the symbology to be used for binary ones 122 and zeros 124. For example, the symbology included in a standard start symbol 206 may use a different symbol, independent of the encoding symbols 208. Therefore, a processor 12 upon reading data associated with a status symbol 206 need only recognize a very limited number of symbols 122, 124 to recognize that a pattern segment 199 containing security data 34 exists in a document 90.

On the other hand, for several reasons, including personal preference, document appearance, probability of successful obscuration, and-the like, a user may be able to select the nature of the encoding symbol 208. The standard symbol 206 may be replicated several times to form a syncmark 212 (a synchronization mark).

The syncmark 212 may serve to synchronize a data stream to be read or interpreted by the processor 12. -Likewise, an encoding sample 214, for example, a replicated set of encoding symbols 208, may present to the processor 12 a sufficient sample of the encoding symbols 208 to establish the symbol type and format of the data representing the information 202 of the pattern segment 199.

In one embodiment, a vendor-specific header 216 may by included. That is, additional data independent of the security data 74 input by a user, may be input by a vendor to indicate the type, serial number, or the like, of a machine preparing the pattern segment 199. Thus, selected encoding symbols 218 may be directed to identification of a manufacturer of equipment, a cryptographic authority authorizing encoding, or the like. Following a header 210, one or more lines 204 containing information 202 may be encoded to correspond to the security data 74 input by a user.

If desired, a trailer 220 may be included in a pattern segment 199. A trailer 220 may contain an end message, a check sum, or the like for verifying the integrity of the pattern segment 199 or security data 74. Alternatively, such checking information may be provided within the header 210. A check sum may provide for rapid verification that a message has been transferred without modification or loss. In one embodiment, sufficient information may be included within a header 210 or a trailer 220 to repair a packet segment 199.

For example, a pattern segment 199 may represent a signature of an authorizing agent signing an document. Such a signature may be transferred electronically. The signature, may be represented by a line corresponding to the line 112, or similar to a line 112 used in a background 94. (See FIG. 3) A pattern segment 199 may actually be included within a line of a signature. The header 210 or trailer 220 may contain sufficient information to reconstruct and to verify the authenticity of a signature. Alternatively, a pattern segment 199, may serve as a watermark 100 over a signature. Thus, a signature may be self-authenticating, as well as self-repairing.

Referring now to FIG. 7, one embodiment of a process 222 or method 222 for creating and retrieving (or reconstructing) documents 90 is adaptable to use by any of several post-process threads 248 or processes 248. In the input step 224, a document 90 may be input using any input device 22. The document data 63 may be used directly or, optionally, stored 226 as a bit map.

When a document 90 is to be interpreted, an executable 80 operating in the processor 12 may read 228 or capture 228 a capture band 206 or standard symbol 206, recognizable by the processor 12, virtually regardless of orientation. The symbol band 208 or encoding symbols 208 may then be synchronized 230 to establish the beginning of an individual, repeated packet 200 of the pattern 120 (security image 120). Synchronization also may include the recognition of the type of the symbols 122, 124 used in the symbol band 208 and throughout the packet 200.

The symbol band of the line 202 beginning with the header 210 is next read 232 for content. Some steps for reading the symbol band 202 have already been taken, by recognizing the capture symbol 206, and the sync-mark 212. However, these procedures 228, 230 may be done for the sole purpose of determining a reading orientation, before being scanned for additional content.

Reading 230 the symbol bands 202, 204 may include first scanning 234 the line 202 for a header 210 or 216. The encoding symbols 208 or 218 may then be analyzed to determine 236 the encoding type. With the beginning or header 210 established, as well as the encoding symbols 208, 218, the remainder of the lines 202, 204 may be read 238. For example the bit map and some character recognition method may be combined to establish (read 232) the pattern of symbols 208, 218 (122, 124).

Next, decoding 240 the symbols 208 into a binary code may be done. Thereafter, decoding 242 the binary code into a formatted output may render the security data 74 interpretable as numbers having meaning to a user, or as plain text, readable in a user's native language.

Optionally, outputting 244 a datafile, representing the decoded packet 200 in plain text, may be done. A user may read a message representing the security data 76 on an output device 24 directly. Alternatively, a memory device 14 may log in a message for review by a security monitor. Likewise, the processor 12 may be programmed to search any output file from the output step 244 for tags, flags, markers, or the like, which may be used by the processor 12 in executing some logging, reporting, or alarm algorithm.

Any one or more threads 246 or processes 246 may be included in a post-process 248 or utility 248. For example, in the accounting step 246a, the processor 12 or another processor may be programmed to authorize copying of a document, count the number of copies made for purposes of charging for the copies according to some copyright royalty scheme, or both.

The verify 246b process or thread may verify that a document 90 is complete or correct, and repair the document 90 if not. The disabling step 246c may engage the processor 12 to render an executable enabled or disabled depending on whether or not it is properly authorized for copying. Thus, the substantive image 98A of the document 90 may be source code in which the security image 120 carries enabling or disabling executable code.

The terminate step, process, or thread 246d may be an alternative to disabling 246c. For example, the terminate thread 246d may simply cease transmitting a file to some destination if an associated security code is not received first.

A pass/fail security key 246e may include operation of an executable 80 to determine whether some security access criterion has been met. Successful execution of the process 246e or thread 246e may be required for any user seeking to send, receive, or otherwise use information in a document 90 protected by security data 74 in a security image 120.

From the above discussion, it will be appreciated that the present invention provides an apparatus and method for assuring security of a document regardless of the form into which the document may be embodied. Moreover, the security information remains regardless of translation of the document between forms, particularly between photocopied hard copies and scanned electronic copies, and between electronic copies in different storage devices.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for media-independent security for a document, the method comprising:
   inputting image data corresponding to an interpretable image displayable by a display device in an interpretable format to be readily interpretable by a user;
   inputting security data corresponding to security information;
   creating, in a first medium, a document comprising:
      a substantive portion; and
      a security portion inseparable from the substantive portion;
   transferring the document into a second medium;
   decoding symbols into binary security data representing the security information; and
   outputting the binary security data in a format retrievable to be interpretable as the security information.

2. The method of claim 1 wherein decoding further comprises:
   transforming the symbols into a bit map;
   capturing a target pattern;
   synchronizing reading;
   orienting in accordance with a direction indicated by the target pattern; and
   reading the symbols.

3. The method of claim 2 wherein the target pattern is comprised of a selected number of the symbols arranged in a pre-designated pattern.

4. The method of claim 3 wherein inputting comprises:
   scanning a hardcopy of the document into a scanning device;
   creating a bit map of the document; and
   storing the bit map in a memory device.

5. The method of claim 4 wherein the security image is comprised of binary symbols copied in a pattern.

6. A memory device effective to store a media-independent security code and an associated document processable by a document processor, the memory device comprising:
   a first block storing an executable, loadable to run on a computer as a document processor application;
   a second block storing substantive data corresponding to information in a document presentable in a format interpretable directly by a user;
   a third block storing security data independent but inseparable from the substantive data; and
   a fourth block storing a security executable, loadable to process the security data and to include the security data in the document independently of the medium in which the document is represented.

7. The memory device of claim 6 wherein the security executable comprises instructions operable to program a computer to provide output data effective to produce a security image in the document in a security format rendering the security image uninterpretable by a viewer interpreting the document.

8. The memory device of claim 6 further comprising a rendering buffer storing output data comprising the substantive data and security data combined in a buffer format to be transmitted to an output device.

9. The memory device of claim 8 wherein the buffer format is effective to output to the output device the output data in a transfer format effective to control the output device to output in the document a substantive image corresponding to the substantive data and directly interpretable by a viewer visually inspecting the document, and to output a security image corresponding to the security data and uninterpretable by the viewer.

10. The memory device of claim 8 wherein the rendering buffer stores background data combined with the security data and effective to include the security data in a background image output by the output device in the document.

11. The memory device of claim 8 wherein the rendering buffer stores watermark data combined with the security data and effective to include the security data in a watermark image.

12. The memory device of claim 6 further comprising a pattern block comprising pattern encoding data for encoding the security data in a security image to be output in the document by an output device.

13. The memory device of claim 12 wherein the pattern block further comprises palette data corresponding to the pattern encoding data, and effective to present to a user for selection by a user, a plurality of encoding patterns corresponding the encoding data.

14. The memory device of claim 6 wherein the memory device is comprised of a plurality of storage devices adapted to receive data.

15. The memory device of claim 6 further comprising security code data corresponding to security codes obscured in a pattern unrecognizable to a user, synchronizing data to synchronize a reader to recognize the pattern, symbol interpretation data to enable the processor to read the pattern to produce a binary code, decoding data to enable the processor to decode the binary code into characters recognizable by a user.

* * * * *